(12) United States Patent
Park et al.

(10) Patent No.: US 8,270,406 B2
(45) Date of Patent: Sep. 18, 2012

(54) METHOD AND APPARATUS FOR BLOCKING FORGED MULTICAST PACKETS

(75) Inventors: Heuk Park, Daejeon (KR); Jong-Tae Song, Daejeon (KR); Kyung-Gyu Jeon, Daejeon (KR); Soon-Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 570 days.

(21) Appl. No.: 12/516,229

(22) PCT Filed: Oct. 31, 2007

(86) PCT No.: PCT/KR2007/005462
§ 371 (c)(1),
(2), (4) Date: May 26, 2009

(87) PCT Pub. No.: WO2008/069455
PCT Pub. Date: Jun. 12, 2008

(65) Prior Publication Data
US 2010/0020796 A1    Jan. 28, 2010

(30) Foreign Application Priority Data
Dec. 8, 2006   (KR) ........................ 10-2006-0125113

(51) Int. Cl.
   *H04L 12/28*   (2006.01)
(52) U.S. Cl. ........... 370/390; 709/224; 709/225; 726/13
(58) Field of Classification Search .................. None
   See application file for complete search history.

(56) References Cited

U.S. PATENT DOCUMENTS
1,774,866 A    9/1930 Beadle
(Continued)

FOREIGN PATENT DOCUMENTS
KR    1020020027225 A    4/2002
(Continued)

OTHER PUBLICATIONS
Dong-Gyu Yeo, et al; "The Analysis of DoS Attack Vulnerability to IGMP and Minimizing Scheme", Proceedings of the 27th KISS Spring Conference, pp. 478-480, 2000.
(Continued)

*Primary Examiner* — Michael J Moore, Jr.
(74) *Attorney, Agent, or Firm* — Ladas & Parry LLP

(57) ABSTRACT

Provided are a method and apparatus for blocking forged multicast packets. The apparatus includes input and output ports connected to user terminals; a forwarding process unit transferring a frame input through one of the input ports to one of the output ports connected to a user terminal having a destination address; a determination unit determining an address of a user terminal connected to one of the input ports from a source address included in the frame; a filtering database storing information on the output port connected to the user terminal having the destination address of the frame based on information received from the determination unit; a multicast gate information unit including information on multicast media access control (MAC) addresses of frames providing a monodirectional multicast service and blocking or forwarding all frames having a corresponding multicast MAC address as the destination address by checking whether the input and output ports are connected to an Internet group management protocol (IGMP) querier or not; and a port information transference unit learning the multicast MAC address of the IGMP querier connected to the apparatus, obtaining information on a port having the multicast MAC address as the destination address from the filtering database, and transferring the information to the multicast gate information unit. According to the present application, forged traffic is blocked from being multicasted and thus restricted resources of a network are prevented from being wasted. As a result, the network may be used more efficiently in an industrial field.

10 Claims, 4 Drawing Sheets

U.S. PATENT DOCUMENTS

| | | | |
|---|---|---|---|
| 5,818,838 A * | 10/1998 | Backes et al. | 370/390 |
| 6,906,674 B2 | 6/2005 | McKinzie, III et al. | |
| 6,917,343 B2 | 7/2005 | Sanchez et al. | |
| 6,970,461 B2 * | 11/2005 | Unitt et al. | 370/390 |
| 6,977,891 B1 | 12/2005 | Ranjan et al. | |
| 7,877,796 B2 * | 1/2011 | Smith | 726/13 |
| 7,936,752 B2 * | 5/2011 | Boers et al. | 370/390 |
| 7,940,765 B2 * | 5/2011 | Rao et al. | 370/390 |
| 2003/0197658 A1 | 10/2003 | Lilly et al. | |
| 2003/0231142 A1 | 12/2003 | McKinzie, III et al. | |
| 2004/0240466 A1* | 12/2004 | Unitt et al. | 370/461 |
| 2005/0080901 A1 | 4/2005 | Reader | |
| 2006/0017651 A1 | 1/2006 | Werner et al. | |
| 2006/0146857 A1 | 7/2006 | Naik et al. | |
| 2006/0153219 A1 | 7/2006 | Wong et al. | |
| 2008/0060026 A1* | 3/2008 | Cheung et al. | 725/81 |
| 2011/0119753 A1* | 5/2011 | Smith | 726/13 |

FOREIGN PATENT DOCUMENTS

| | | |
|---|---|---|
| KR | 1020040085802 A | 10/2004 |
| KR | 1020050060862 A | 6/2005 |
| KR | 1020060069614 A | 6/2006 |

OTHER PUBLICATIONS

International Search Report: mailed Jan. 22, 2008; PCT/KR2007/005462.

* cited by examiner

METHOD AND APPARATUS FOR BLOCKING FORGED MULTICAST PACKETS

TECHNICAL FIELD

The present invention relates to a network, and more particularly, to a method and apparatus for blocking an attack that uses a forged multicast frame by copying a well known source in a multicast service, especially, in real-time Internet protocol television (IPTV) services.

This work was supported by the IT R&D program of MIC/IITA [2006-S-064-01, BCN Network Engineering].

BACKGROUND ART

FIG. 1 is a functional diagram of a conventional layer 2 (L2) switch 200 connected to user terminals 110 and 120.

Referring to FIG. 1, the L2 switch 200 includes an input port 210, an output port 220, a forwarding process unit 250 transferring a frame input through the input port 210 to the output port 220 that is connected to a user terminal 120 having a destination address, a determination unit 260 learning an address of a user terminal 110 that is connected to the input port 210 from a source address included in the frame, and a filtering database 270 storing information on the output port 220 connected to the user terminal 120 having the destination address of the frame based on information received from the determination unit 260. The L2 switch 200 may further include a group management unit 280 functioning as an Internet group management protocol (IGMP) proxy and managing multicast groups.

When the input port 210 receives the frame from the user terminal 110, the input port 210 notifies the determination unit 260 of receiving the frame and transfers the frame to the forwarding process unit 250. The forwarding process unit 250 transfers the frame to the output port 220 connected to the user terminal 120 having the destination address with reference to the filtering database 270.

The determination unit 260 reads the source address of the frame and notifies the filtering database 270 that the user terminal 110 having the source address is connected to the input port 210. Accordingly, the filtering database 270 obtains information on the user terminals 110 and 120 respectively connected to the input and output ports 210 and 220.

A unicast frame uses a receiver's specific address as the destination address and a transmitter's specific address as the source address and thus the receiver of the frame is always identified. However, a multicast frame uses a multicast address as the destination address instead of the receiver's specific address and then the multicast address cannot be learned by performing a source media access control (MAC) learning method. The frame that has the multicast address unregistered to the filtering database 270 as the destination address is forwarded from the L2 switch 200 to every port and thus a multicast stream even flows into routes unconnected to the user terminal 120 that needs to receive data. As a result, bandwidths are wasted and, at worst, a multicast service can be paralyzed.

In order to prevent the above-described problem, in general, the L2 switch 200 performs IGMP snooping. An IGMP manages the multicast groups on an Internet protocol (IP) layer. Originally, the L2 switch 200 may not read the IGMP. Accordingly, the L2 switch 200 includes the group management unit 280 that can read the IGMP so as to check the output port 220 connected to the user terminal 120 that needs to receive the data with respect to a certain multicast address.

FIG. 2 is a diagram for describing a conventional attack by forged multicast packets when only IGMP snooping is preformed. In FIG. 2, solid arrows 12, 14, and 16 represent normal traffic and dotted arrows 22, 24, and 26 represent abnormal traffic.

Referring to FIG. 2, when normal user terminals 120 and 130 that are allowed to receive data request an L2 switch 200 for the data with respect to a certain multicast address (hereinafter referred to as an MA1) by using frames including IGMP control packets (hereinafter referred to as IGMP frames), the L2 switch 200 determines ports 220 and 230 of the requested user terminals 120 and 130 as reception ports of the MA1, and updates a filtering database. The L2 switch 200 notifies an IGMP querier (not shown) about the result of the update.

In general, an IGMP is used by hosts participating in a multicast service in order to register the hosts with a router for multicast communication. Here, the router that manages registration of the hosts is referred to as the IGMP querier.

A reference numeral 300 may be the IGMP querier or may be a layer 3 (L3) switch disposed on a route from a corresponding subnet to the IGMP querier.

The IGMP querier 300 reflects the result of updating to an upper multicast routing protocol, routes multicast packets having the MA1, and transfers received multicast packets to the L2 switch 200. The L2 switch 200 transmits the multicast packets to the ports 220 and 230 identified as the reception ports of the MA1. In this case, if another user terminal 110 forges a multicast packet having the MA1 and transmits the forged multicast packet to a port 210, the L2 switch 200 transmits the forged multicast packet to the ports 220 and 230 with reference to the filtering database. Accordingly, the normal traffic 14 and 16, and the abnormal traffic 24 and 26 flow at the same time through the ports 220 and 230. When forged packets of the forged multimedia traffic 24 and 26 respectively flow into the user terminals 120 and 130, unless properly processed, quality of an image displayed by using the data included in the normal traffic 14 and 16 may deteriorate.

Although the user terminals 120 and 130 have a function to cope with the above-described problem, if a large number of user terminals such as the user terminal 110 intend to make an attack, bandwidths between the user terminals and the L2 switch 200 are filled with abnormal traffic and thus the multicast communication can be paralyzed. The attack may be generated by, for example, a computer virus.

A multicast packet input through any port other than the ports 220 and 230 connected to the user terminals 120 and 130 that are allowed to receive the data may be blocked by setting a virtual local area network (VLAN). For example, an input port 240 through which a normal multicast packet is input and the ports 220 and 230, which are output ports of the normal multicast packets, may be combined together to form one VLAN.

However, it is not easy to manage VLANs with respect to a plurality of multicast addresses and a problem of scalability may occur. Internet protocol television (IPTV) service providers may provide hundreds of channels and the number of channels will increase as demand for more channels grows in the future. However, it is not efficient to use the VLANs to combine ports together because the allowable number of VLAN addresses is limited and the VLANs have various other uses. Furthermore, although the VLAN is set, a user terminal not subscribed to the VLAN may be blocked. However, a user terminal subscribed to the VLAN may not be blocked from transmitting the forged multicast packet to an address of the VLAN. Accordingly, a method of blocking an inflow of a multicast packet that has an IPTV source address and is input from a port other than a transmission port, is necessary.

In short, in a monodirectional multicast service such as a real-time IPTV service, if information on a source of data transmission is broadly known, a forged frame voluntarily generated by an ill-intentioned user can enter a network. Unless properly processed, the forged frame may cause two kinds of problems as described below.

If the forged frame enters a user terminal that doesn't have a device for blocking it, image quality of the user terminal may deteriorate. Also, if a plurality of users transmit the forged frame at the same time, for example, by a computer virus, the forged frame encroaches upon resources of the network and thus performance of the network may be reduced. In particular, an L2 switch widely used by an access network rarely is prepared for the above-mentioned risks and thus the network may be paralyzed when a synchronized attack is made.

DISCLOSURE OF INVENTION

Technical Problem

The present invention provides a method and apparatus for blocking forged multicast packets, capable of blocking an inflow of forged multicast packets within a network in a monodirectional multicast service such as a real-time Internet protocol television (IPTV) service

Technical Solution

According to an aspect of the present invention, there is provided an apparatus for blocking forged multicast packets, the apparatus including input and output ports connected to user terminals; a forwarding process unit transferring a frame input through one of the input ports to one of the output ports connected to a user terminal having a destination address; a determination unit determining an address of a user terminal connected to one of the input ports from a source address included in the frame; a filtering database storing information on the output port connected to the user terminal having the destination address of the frame based on information received from the determination unit; a multicast gate information unit including information on multicast media access control (MAC) addresses of frames providing a monodirectional multicast service and blocking or forwarding all frames having a corresponding multicast MAC address as the destination address by checking whether the input and output ports are connected to an Internet group management protocol (IGMP) querier or not; and a port information transference unit learning the multicast MAC address of the IGMP querier connected to the apparatus, obtaining information on a port having the multicast MAC address as the destination address from the filtering database, and transferring the information to the multicast gate information unit.

The apparatus may further include a group management unit functioning as an IGMP proxy and managing multicast groups.

According to another aspect of the present invention, there is provided a method of blocking forged multicast packets in a layer 2 (L2) switch, the method including checking whether input and output ports of the L2 switch are connected to an Internet group management protocol (IGMP) querier or not; and forwarding frames having a corresponding multicast address input through a port determined to be connected to the IGMP querier and blocking frames having the corresponding multicast address input through a port determined to be unconnected to the IGMP querier.

The checking may be performed by determining a corresponding media access control (MAC) address of the IGMP querier from a received IGMP join message and checking the ports connected to the IGMP querier from an output port corresponding to the MAC address, or by transferring an MAC address of an interface connected to the an access network by the IGMP querier and checking the ports connected to the IGMP querier from an output port corresponding to the MAC address.

Advantageous Effects

According to the present application, forged traffic is blocked from being multicasted and thus restricted resources of a network are prevented from being wasted. As a result, the network may be used more efficiently in an industrial field.

DESCRIPTION OF DRAWINGS

The above and other features and advantages of the present invention will become more apparent by describing in detail exemplary embodiments thereof with reference to the attached drawings in which.

BEST MODE

Hereinafter, the present invention will be described in detail by explaining embodiments of the invention with reference to the attached drawings.

A router uses a group membership management protocol such as an Internet group management protocol (IGMP) in order to learn about receivers connected to a subnet. If it is determined by the IGMP that a subscriber of a certain multicast address (hereinafter referred to as an MA2) exists in the subnet, a layer 3 (L3) switch transmits a multicast packet having the MA2 as a destination address to a port connected to the corresponding subnet. In a multicast service such as a real-time Internet protocol television (IPTV) service, a source of the multicast packet exists only in a certain region of a network and thus a route between a certain terminal and the source is determined in accordance with the position of the terminal. Also, in the real-time IPTV service, multicast traffic always flows from the source to the terminal and thus any multicast packet which has a corresponding address of the real-time IPTV service and enters the network from other positions other than the position of the source can be determined as being forged.

The present invention provides a method of determining a port through which normal real-time IPTV service traffic flows in a layer 2 (L2) switch and blocking an inflow of the real-time IPTV service traffic from other ports. According to the present invention, a normal inflow port is determined by checking an output port having the destination address of an IGMP frame in an L2 layer. Operations of the present invention will now be described in detail.

Figure 3:
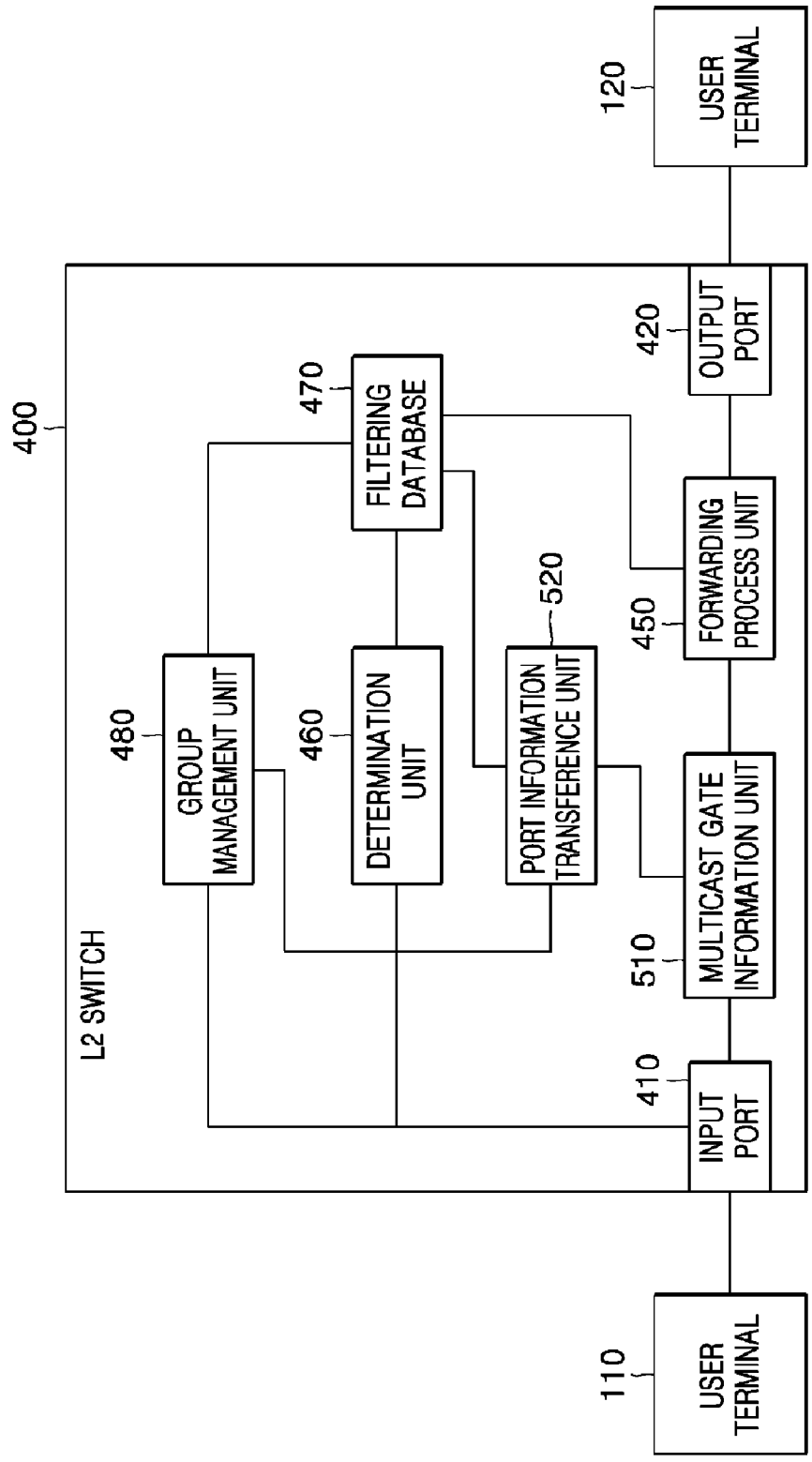
FIG. 3 is a diagram of an L2 switch for blocking forged multicast packets, according to an embodiment of the present invention.

FIG. 3 is a diagram of an L2 switch 400 for blocking forged multicast packets, according to an embodiment of the present invention.

Figure 1:
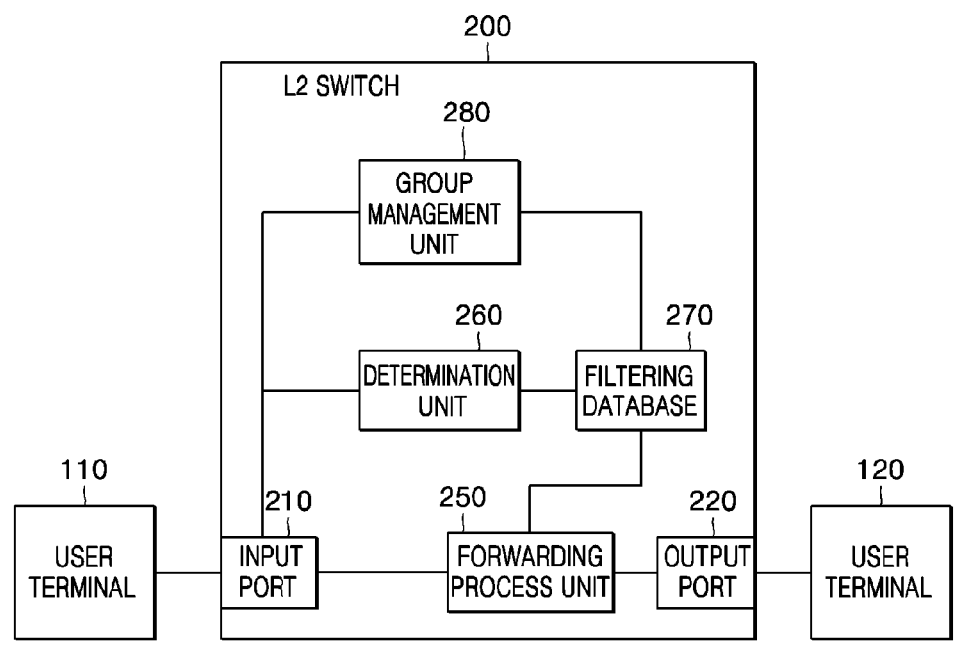
FIG. 1 is a functional diagram of a conventional layer 2 (L2) switch connected to user terminals.
Figure 2:
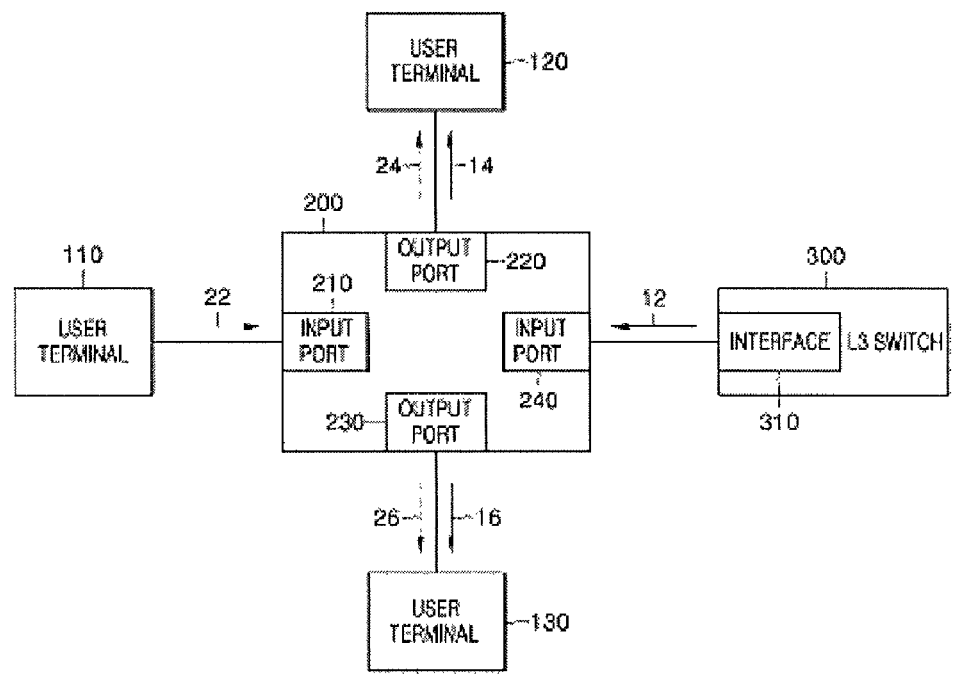
FIG. 2 is a diagram for describing a conventional attack by forged multicast packets when only Internet group management protocol (IGMP) snooping is preformed.

Referring to FIG. 3, the L2 switch 400 is connected to user terminals 110 and 120. The L2 switch 400 includes an input port 410, an output port 420, a forwarding process unit 450, a determination unit 460, a filtering database 470, and a group management unit 480 functioning as an IGMP proxy, which has the same functions as corresponding elements of the conventional L2 switch 200 described in FIG. 1. The L2 switch 400 further includes a multicast gate information unit 510 having a multicast source filtering function and a port information transference unit 520 including multicast gate information. The multicast gate information unit 510 and the port information transference unit 520 have functions in accordance with the present invention.

The port information transference unit 520 determines a media access control (MAC) address of an IGMP querier, receives information on a port having the MAC address as a destination address from the filtering database 470, and transfers the information to the multicast gate information unit 510.

The multicast gate information unit 510 has to have information on multicast MAC addresses of frames providing a unidirectional multicast service such as a realtime IPTV service. If information that the corresponding port, that is, an input port 410, is not connected to the IGMP querier is received from the port information transference unit 520, the multicast gate information unit 510 blocks all the frames having the corresponding multicast MAC address as the destination address. If information that the input port 410 is connected to the IGMP querier is received from the port information transference unit 520, the multicast gate information unit 510 allows all the frames having the corresponding multicast MAC address as the destination address to be forwarded.

The multicast gate information unit 510 may basically filter all the ports and may only allow the ports connected to the IGMP querier to forward the multicast frames.

If the IGMP querier and an edge router that routes a multicast stream are different, the edge router uses an MAC address of an interface connected to a corresponding access network.

The multicast gate information unit 510 may obtain the information on the MAC address of the IGMP querier by using a variety of methods.

If the edge router and the IGMP querier are the same, the information may be obtained by the group management unit 480 functioning as the IGMP proxy. The group management unit 480 has a function to intercept and examine the IGMP frames. Accordingly, a certain multicast frame includes an IGMP control packet, and the destination address of the certain multicast frame is the MAC address of an L3 switch that is first encountered by the corresponding subnet. The L3 switch may be disposed on a route from the corresponding subnet to the IGMP querier. Alternatively, the IGMP querier may be used instead of the L3 switch. In both cases, the output port of the multicast frame including the IGMP control packet is on a distribution route of the multicast stream and thus the MAC address may be used.

Alternatively, a control system informs the multicast gate information unit 510 about the MAC address of the L3 switch that is first encountered by the corresponding subnet. If information on which port of the L3 switch a certain L2 switch is connected to, does not exist, although the control system informs about MAC addresses of all interfaces of the corresponding L3 switch, one subnet has only one destination address of the IGMP control packet and thus the L2 switch 400 according to the current embodiment may normally operate.

Figure 4:
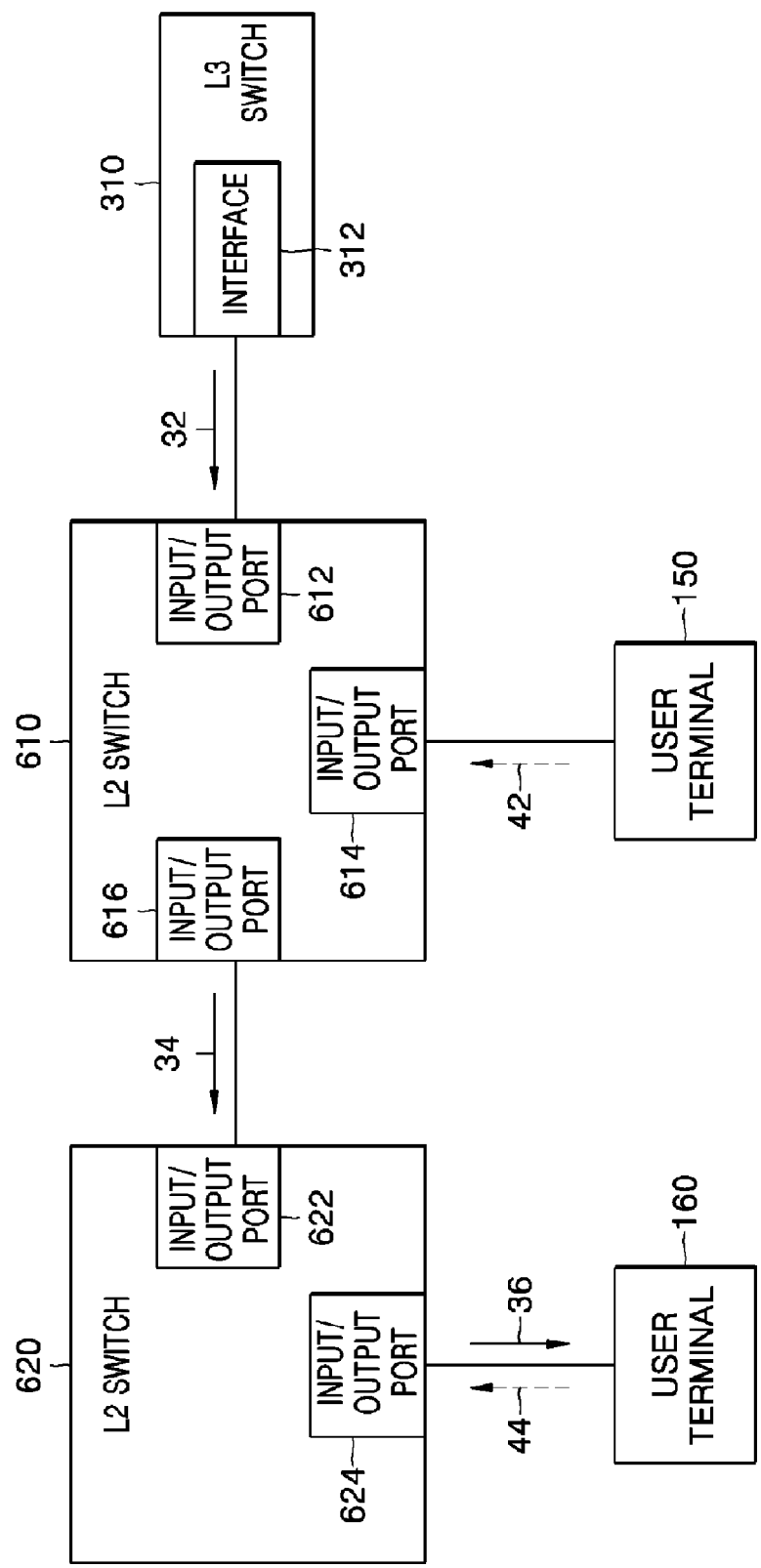
FIG. 4 is a diagram for describing effects of L2 switches for blocking forged multicast packets, according to an embodiment of the present invention.

FIG. 4 is a diagram for describing effects of L2 switches 610 and 620 for blocking forged multicast packets, according to an embodiment of the present invention.

In FIG. 4, solid arrows 32, 34, and 36 represent normal multicast streams input through normal routes and dotted arrows 42 and 44 represent forged multicast streams input through abnormal routes. A reference numeral 310 may be an IGMP querier or may be an L3 switch disposed on a route from a corresponding subnet to the IGMP querier. Reference numerals 150 and 160 represent user terminals. In particular, the user terminal 160 receives an IPTV multicast service.

The user terminal 160 transmits an IGMP join message to the IGMP querier 310 by using a multicast frame in order to receive data. A destination address of the multicast frame may be an MAC address of an interface port 312 of the IGMP querier 310 that may be an edge router. Multicast gate information units (not shown in FIG. 4 and corresponding to the reference number 510 of FIG. 3) of the L2 switches 610 and 620 determine the MAC address of the interface port 312 by the destination address of the IGMP join message or by a control system. The control system also informs the multicast gate information units of the L2 switches 610 and 620 about multicast addresses to which data transmission has to be restricted.

By performing a source MAC learning method, filtering databases (not shown in FIG. 4 and corresponding to the reference number 470 of FIG. 3) of the L2 switches 610 and 620 are informed that a multicast frame including a IGMP control packet may be output through input/output ports 612 and 622 of the L2 switches 610 and 620. IPTV multicast traffic is not allowed to flow into a network through other ports 614, 616, and 624 except for through the ports 612 and 622. Although the user terminal 150 and 160 generate and transmit the forged multicast traffic 42 and 44 having a multicast address that corresponds to the IPTV multicast service, the forged multicast traffic 42 and 44 do not flow into the network. Accordingly, the forged multicast traffic 42 ad 44 are blocked so as not to waste resources of the network.

It is obvious to those of ordinary skill in the pertinent art that each operation of the present invention can be implemented in a software or hardware manner using a general programming method.

The present invention can also be implemented as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

As described above, according to the present application, forged traffic is blocked from being multicasted and thus restricted resources of a network are prevented from being wasted. As a result, the network may be used more efficiently in an industrial field.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for blocking forged multicast packets, the apparatus comprising:
   input and output ports connected to user terminals;
   a forwarding process unit transferring a frame input through one of the input ports to one of the output ports connected to a user terminal having a destination address;
   a determination unit determining an address of a user terminal connected to one of the input ports from a source address included in the frame;
   a filtering database storing information on the output port connected to the user terminal having the destination address of the frame based on information received from the determination unit;
   a multicast gate information unit including information on multicast media access control (MAC) addresses of frames providing a unidirectional multicast service and blocking or forwarding all frames having a corresponding multicast MAC address as the destination address by checking whether the input and output ports are connected to an Internet group management protocol (IGMP) querier or not; and
   a port information transference unit learning the multicast MAC address of the IGMP querier connected to the apparatus, obtaining information on a port having the multicast MAC address as the destination address from the filtering database, and transferring the information to the multicast gate information unit.

2. The apparatus of claim 1, wherein, if information that one of the input ports is not connected to the IGMP querier is received from the port information transference unit, the multicast gate information unit blocks all the frames having the corresponding multicast MAC address as the destination address, and if information that one of the input ports is connected to the IGMP querier is received from the port information transference unit, the multicast gate information unit allows all the frames having the corresponding multicast MAC address as the destination address to be forwarded.

3. The apparatus of claim 1 or 2, wherein the multicast gate information unit checks all the input and output ports to determine whether the ports are connected to the IGMP querier or not and allows the frames having the corresponding multicast MAC address to be input or forwarded only with respect to the ports connected to the IGMP querier.

4. The apparatus of claim 1, wherein, if the IGMP querier and an edge router that routes a multicast stream are different, the MAC information included in the multicast gate information unit is an MAC address of an interface connected to an access network corresponding to the edge router.

5. The apparatus of claim 1, further comprising a group management unit functioning as an IGMP proxy and managing multicast groups.

6. The apparatus of claim 1, 2, 4, or 5, wherein, when one of the input ports receives the frame from the user terminal, the input port notifies the determination unit of receiving the frame and transfers the frame to the forwarding process unit, and the forwarding process unit transfers the frame to the output port connected to the user terminal having the destination address with reference to the filtering database.

7. The apparatus of claim 6, wherein the determination unit reads the source address of the frame and notifies the filtering database that the user terminal having the source address is connected to the input port, and the filtering database stores the notified information.

8. The apparatus of claim 1, wherein the checking whether the ports are connected to the IGMP querier is performed by determining a corresponding MAC address of the IGMP querier from a received IGMP join message and checking the ports connected to the IGMP querier from an output port corresponding to the MAC address.

9. The apparatus of claim 3, wherein the checking which ports are connected to the IGMP querier and whether the ports are connected to the IGMP querier is performed by transferring an MAC address of an interface connected to an access network by the IGMP querier and checking the ports connected to the IGMP querier from an output port corresponding to the MAC address.

10. A method of blocking forged multicast packets in a layer 2 (L2) switch, the method comprising:
    checking whether input and output ports of the L2 switch are connected to an Internet group management protocol (IGMP) querier or not; and
    forwarding frames having a corresponding multicast address input through a port determined to be connected to the IGMP querier and blocking frames having the corresponding multicast address input through a port determined to be unconnected to the IGMP querier,
    wherein the checking is performed by determining a corresponding media access control (MAC) address of the IGMP querier from a received IGMP join message and checking the ports connected to the IGMP querier from an output port corresponding to the MAC address, or by transferring an MAC address of an interface connected to an access network by the IGMP querier and checking the ports connected to the IGMP querier from an output port corresponding to the MAC address.

* * * * *